UNITED STATES PATENT OFFICE.

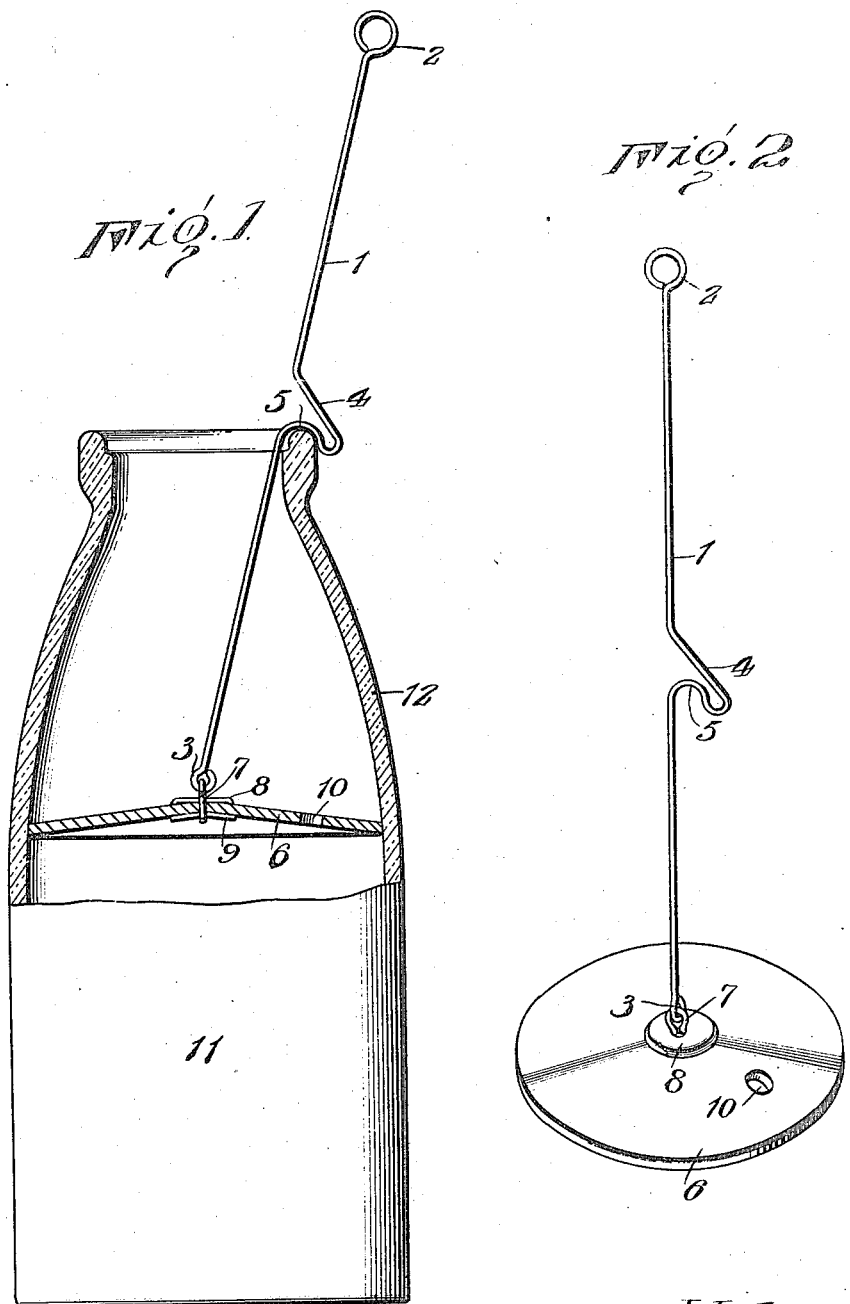

BEECHER W. JUNK, OF COLUMBUS, OHIO.

MILK AND CREAM SEPARATOR.

1,261,403. Specification of Letters Patent. Patented Apr. 2, 1918.

Application filed September 8, 1916. Serial No. 119,055.

*To all whom it may concern:*

Be it known that I, BEECHER W. JUNK, a citizen of the United States, and resident of Columbus, in the county of Franklin and State of Ohio, have invented certain new and useful Improvements in Milk and Cream Separators, of which the following is a specification.

The present invention relates to a new and improved type of milk and cream separator and has particular reference to devices of this character commonly employed in separating cream from milk as contained in a milk bottle or the like.

The primary object of my invention is to provide a cheaply constructed, strong and durable and useful device of this character which may be quickly and easily inserted into any milk bottle for withdrawing the cream from the milk.

Another object of my invention is to provide a milk and cream separator of the class described which may be quickly inserted and removed from operative position, the separator consisting of few parts facilitating the cleaning and repair of the same.

Other objects and advantages to be derived from the use of my improved milk and cream separator will appear from the following detail description and the claim, taken with an inspection of the accompanying drawing, in which:

Figure 1 is a fragmental vertical sectional view of a milk bottle showing my improved separator in operative position; and Fig. 2 is a perspective view of the separator.

Referring more particularly to the drawing, wherein similar characters of reference designate like and corresponding parts throughout the various views, 1 designates a wire strand, preferably formed of stiff material having a handle portion 2 on the upper end thereof, and a loop 3 on the lower end thereof. The intermediate portion of the wire strand 1 is offset as at 4 to form a hook portion 5 for a purpose which will hereinafter appear.

A separating disk 6 is provided, said disk 6 being formed of rubber or some similar flexible material and being preferably concave or convex in cross section, as best shown in Fig. 1. A cotter pin 7 extends through the disk 6, plates 8 and 9 being arranged on the upper and lower sides of the disk to be engaged by said cotter pin, the cotter pin being connected with the loop 3. The disk 6 is provided with an opening 10, said opening being arranged preferably midway between the center of the disk and the outer peripheral edge thereof.

In Fig. 1 a milk bottle has been shown and designated 11, said bottle having the usual tapering portions 12.

In use the separator is inserted into the bottle, the disk being formed of flexible material and being readily contracted for this purpose. When inserted into the bottle the disk is drawn upwardly until the peripheral edge thereof engages the inner peripheral surface of the tapering portion 12 of the bottle, the disk being made of various sizes for different sizes of bottles so as to reach a point very nearly in alinement with the usual dividing line between the milk and cream. At this time the hook 5 is engaged with the upper edge of the mouth of the bottle and thereby retains the disk in position. The cream may now be poured from the bottle without disturbing the milk. The object of the opening 10 is to permit movement of the disk through the milk, that is, when the disk is being moved into the position shown in Fig. 1. None of the milk will pass through the opening 10 when the bottle is tilted except a few drops which will not interfere with the withdrawal of the cream. No air being permitted to enter the milk chamber formed by the disk 6 it will be apparent that escape of milk therefrom is practically impossible.

From the above description taken in connection with the accompanying drawing, it is thought that a clear and comprehensive understanding of the construction, operation and advantages of my invention may be had, and while I have shown and described the device as embodying a specific structure, I desire that it be understood that such changes be made in said structure as do not depart from the spirit and scope of the invention as claimed.

Having thus fully described my invention, what I claim as new and desire to secure by Letters Patent, is:—

A device of the class described including a disk of flexible material adapted to fit the interior diameter of a milk bottle and of a larger diameter than the diameter of the contracted bottle mouth, a rod connected with the center of the disk whereby after insertion in the bottle the disk may be raised to a horizontal position until its perimeter engages the contracted mouth portion of the bottle, said rod being shaped to engage the edge of the bottle mouth to secure the disk in position with its center portion bowed, and the disk having an aperture therein to permit the free flow of the milk as the disk is raised until the disk is positioned against the cream accumulated in the contracted mouth portion of the bottle.

In testimony whereof, I affix my signature hereto.

BEECHER W. JUNK.